United States Patent [19]
Kudo et al.

[11] Patent Number: 4,587,416
[45] Date of Patent: May 6, 1986

[54] FOCUS DETECTING APPARATUS FOR MICROSCOPE OR CAMERA

[75] Inventors: Koichi Kudo, Yokohama; Hidehiro Ogawa, Tokyo; Atsushi Kawahara, Kawasaki, all of Japan

[73] Assignee: Nippon Kogaku K. K., Tokyo, Japan

[21] Appl. No.: 508,166

[22] Filed: Jun. 27, 1983

[30] Foreign Application Priority Data

Jul. 2, 1982 [JP] Japan ................. 57-114082

[51] Int. Cl.$^4$ ............................... G03B 3/10
[52] U.S. Cl. .................... 250/204; 250/201; 354/402; 354/406
[58] Field of Search .............. 250/204, 201; 354/402–409; 356/4

[56] References Cited

U.S. PATENT DOCUMENTS

| 4,186,301 | 1/1980 | Basire et al. | 250/204 |
| 4,311,904 | 1/1982 | Okada et al. | 250/204 |
| 4,327,284 | 4/1982 | Suzuki | 354/402 |

*Primary Examiner*—Edward P. Westin
*Attorney, Agent, or Firm*—Shapiro and Shapiro

[57] ABSTRACT

A focus detecting apparatus having an optical device movable to cause the light from an object to be imaged on a predetermined plane and comparing the different imaged conditions of the light from the object on the predetermined plane comprises a light intensity distribution detecting device for detecting the distribution of the intensity of light on the predetermined plane and putting out a detection signal indicative of the distribution of the intensity of light on the predetermined plane, a device for taking out a high frequency component from the detection signal, a device for rectifying the taken out high frequency component, a device for forming the envelope of the rectified high frequency component, a device for integrating the envelope at any time and putting out an integrated value, and a focus detecting device for detecting, on the basis of the integrated value of the envelope, the amount of movement necessary for the imaging optical device to cause the light from the object to be imaged on the predetermined plane.

10 Claims, 11 Drawing Figures

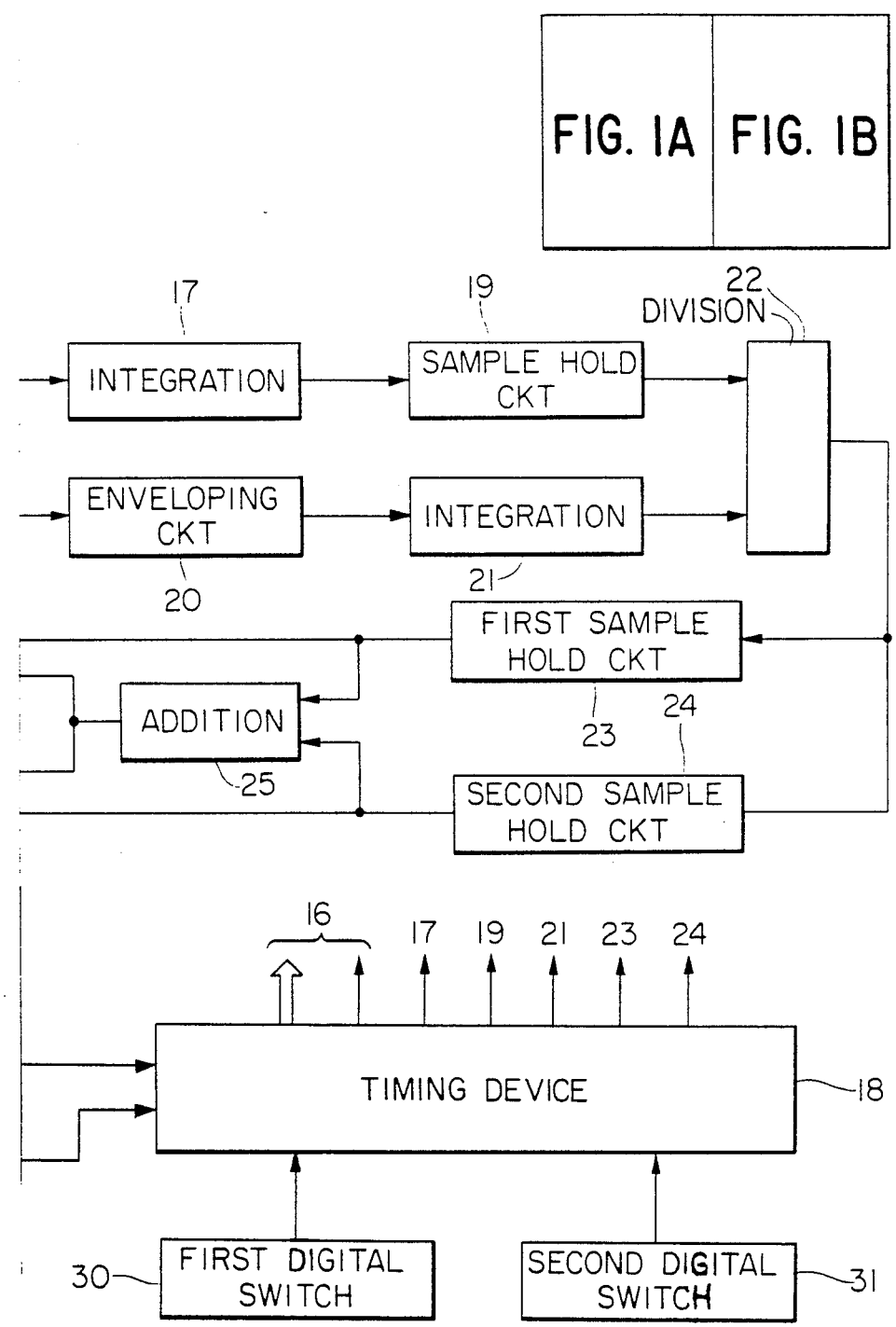

FOCUS DETECTING APPARATUS FOR MICROSCOPE OR CAMERA

BACKGROUND OF THE INVENTION

1. Field of the Invention

This invention relates to a focus detecting apparatus of high accuracy best suited for use as the automatic focusing apparatus of an optical microscope, a camera or the like.

2. Description of the Prior Art

An automatic focus detecting apparatus as disclosed, for example, in U.S. Pat. No. 4,311,904 is known. In such apparatus, the image signal of an object image by an image sensor has been obtained, a signal which is a high frequency component of a magnitude corresponding to the contrast such as light and dark (hereinafter referred to as the edge signal) has been obtained from the image signal and the edge signal has been integrated to obtain a signal, corresponding to the deviation from the in-focus point. The edge signal corresponds to the boundary of the contrast of the object image formed by the image sensor.

In such apparatus, as the object image on the light-receiving surface of the image sensor becomes approximate to the in-focus state (as the deviation from the in-focus point becomes approximate to zero), the peak value of the aforementioned edge signal becomes a signal which is gradually greater in magnitude and gradually narrower in width. As a general tendency, the output signal of an integration circuit which integrates the edge signal rises as the in-focus state is approached, and assumes a maximum value during the in-focus condition, but in some cases, it exhibits some decrease depending on the object, and this has led to the possibility of degrading the focusing accuracy.

Also, where the contrast on the light-receiving surface is so small that for example, the number of boundaries between the light and the dark is one, the amount of integration by the integrating circuit is small, and this has led to the problem that S/N is low and an out-of-focus signal is not obtained.

SUMMARY OF THE INVENTION

It is an object of the present invention to provide a focus detecting apparatus which enables a signal indicative of the deviation from the in-focus point to be obtained at high accuracy for any object.

The invention will become fully apparent from the following detailed description thereof taken in conjunction with the accompanying drawings.

DESCRIPTION OF THE PREFERRED EMBODIMENTS

Figure 1A:
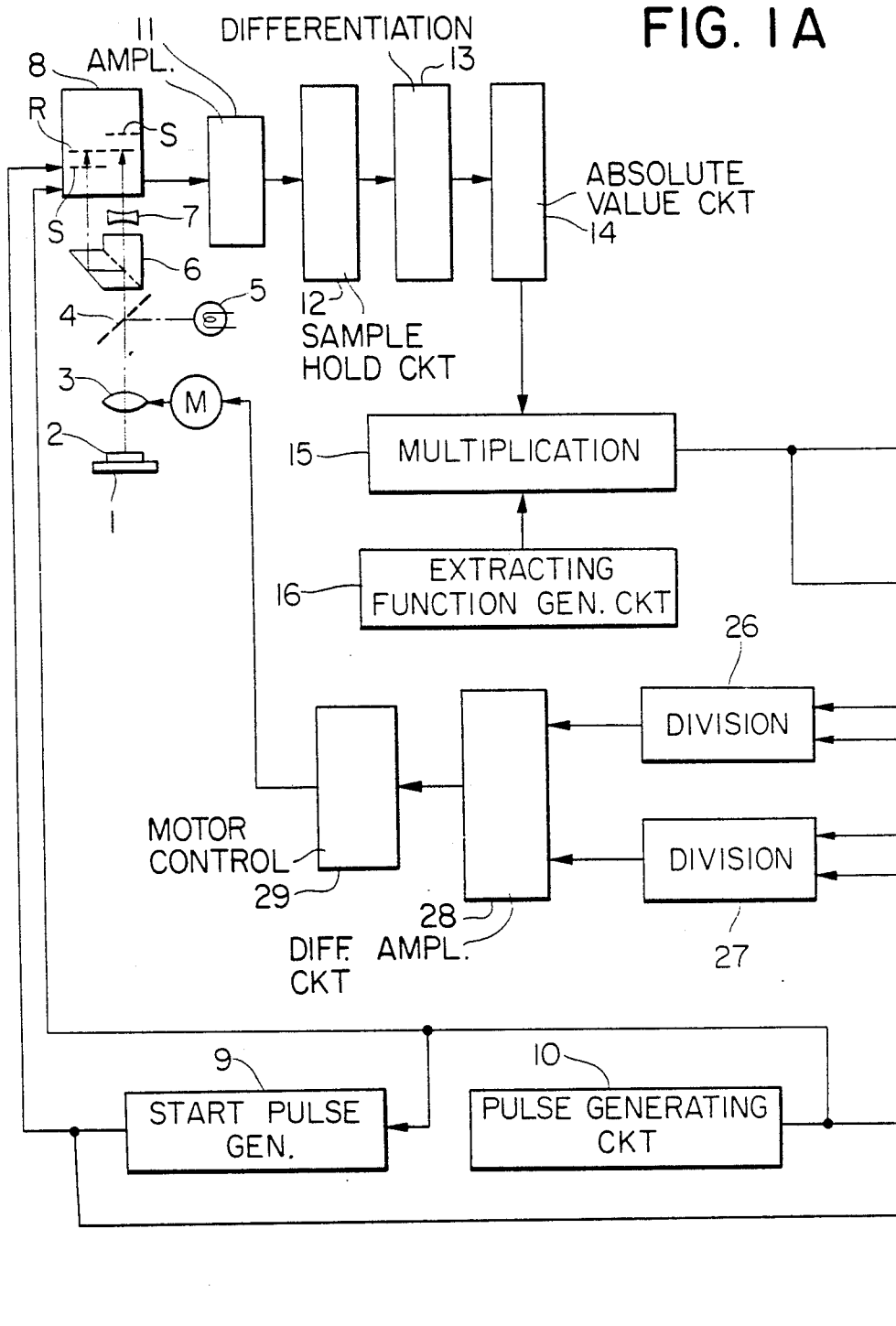
FIG. 1 shows the juxtaposition of FIGS. 1A and 1B, which illustrate a first embodiment of the present invention.
Figure 3:
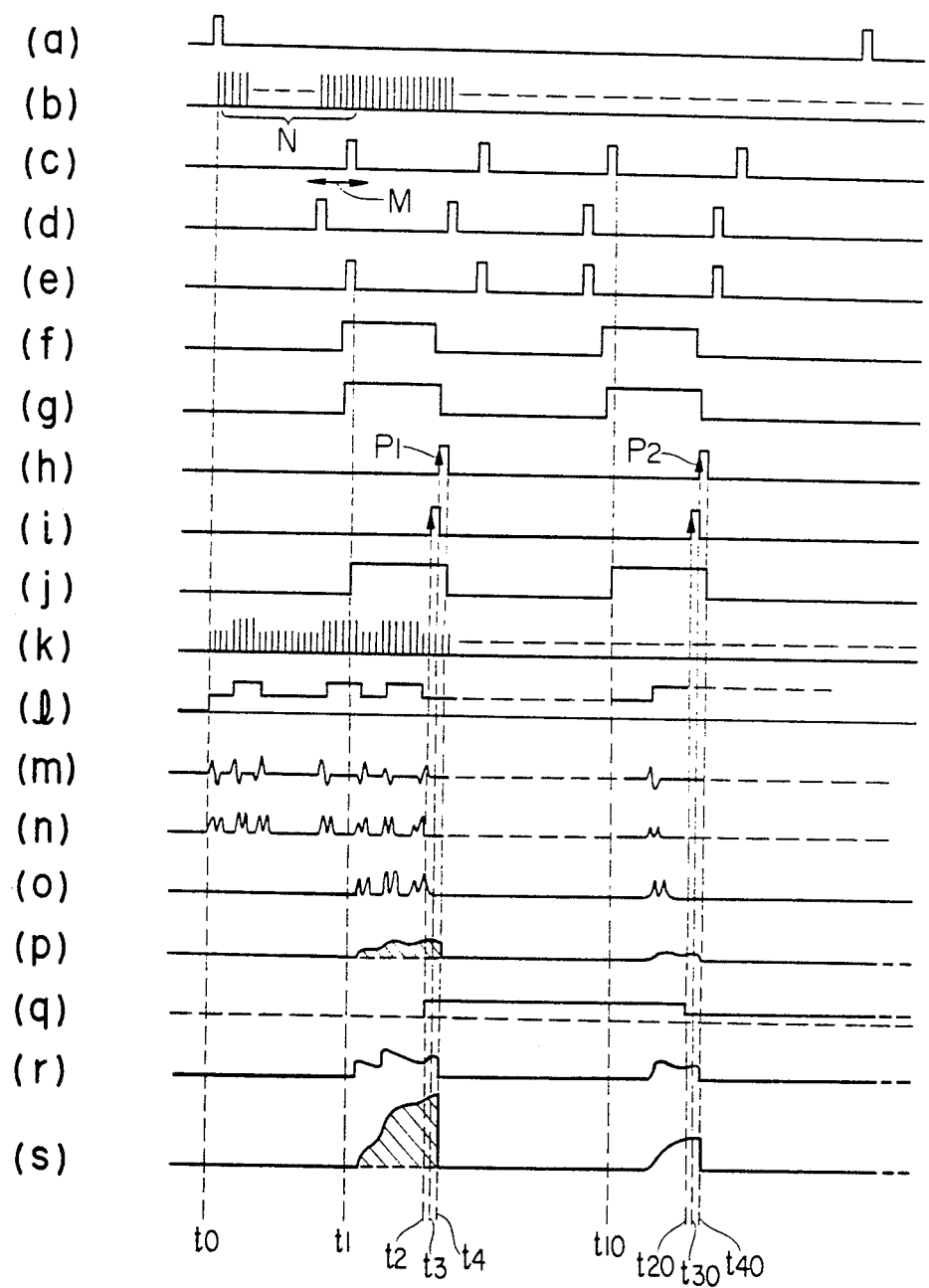
FIG. 3 is a timing chart for explaining the operation in FIGS. 1 and 2.

An embodiment of the present invention will hereinafter be described by reference to FIGS. 1 and 3.

A sample 2 on a stage 1 is illuminated by a light source 5 through an objective lens 3 and a half-mirror 4. The image of the sample 1 can be formed on a focusing screen or a film surface, not shown, by the objective lens 3 being moved in the direction of the optical axis. Light transmitted through the half-mirror 4 is divided into two optical paths in the plane of the drawing sheet by an optical path dividing prism 6 and thereafter enters an image sensor 8 disposed astride of the optical paths. The position of the image sensor 8 is adjusted such that the left half of the light-receiving surface R of the image sensor 8 provides the rear side of a reference plane S equivalent to a plane on which the focusing screen, the film surface or the like is disposed and the right half of the light-receiving surface R of the image sensor 8 provides the fore side of the above-mentioned reference plane S (shown split into two parts). The photoelectrically converted signal from the left half of the image sensor 8 corresponds to a so-called rear focus signal and the photoelectrically converted signal from the right half of the image sensor 8 corresponds to a so-called front focus signal. A negative lens 7 is inserted between the optical path dividing prism 6 and the right half of the light-receiving surface R of the image sensor 8 and serves to make the sizes of the images coincident with each other on the left half and the right half of the image sensor 8. Accordingly, during an in-focus condition, the image of the sample 2 is formed on the aforementioned reference planes. To make the sizes of the images constant on the left half and the right half of the image sensor 8, an optical system may be constructed so that the two optical paths are formed by a telecentric system, instead of the negative lens 7.

The image sensor 8, as is well known, is driven by a start pulse generator 9 and a pulse generating circuit 10. That is, the elements of the image sensor 8 are successively driven by the pulse from the pulse generating circuit 10 input subsequently to the start pulse from the start pulse generator 9 and time-serially put out image signals synchronous with this pulse. An amplifier 11 amplifies the image signals from the image sensor 8 and applies them to a sampling and holding circuit 12. The sampling and holding circuit 12 samples and holds the image signals from the amplifier 11 on the basis of the pulse (not shown) from the pulse generating circuit 10. The output signal of the sampling and holding circuit 12 is applied as input to a differentiation circuit 13. The differentiation signal of the differentiation circuit 13 has its polarity regularized by an absolute value circuit 14 and becomes a signal corresponding to the contrast. The output signal of the absolute value circuit 14 is applied as input to one input terminal of a multiplier 15. The extracting function from an extracting function generating circuit 16 is applied as input to the other input terminal of the multiplier 15. The extracting function is a function for extracting only the necessary portion of the output signal from the absolute value circuit 14. The multiplier 15 multiplies the signal of the one input terminal by the signal of the other input terminal and applies the result of the multiplication to an integration circuit 17 and an enveloping circuit 20. The integration circuit 17 alternately integrates the signal obtained from the left half of the light-receiving surface R of the image sensor, namely, the signal from the multiplier 15 corresponding to the rear focus signal, and the signal obtained from the right half of the light-receiving surface R of the image sensor, namely, the signal from the multiplier 15 corresponding to the front focus signal, on the basis of the signal from a timing device 18, and applies them to a sampling and holding circuit 19. The sampling and holding circuit 19 alternately samples and holds the integration signal of the integrator 17 by the rear focus signal and the front focus signal on the basis of the signal from the timing device 18. The output signal of the enveloping circuit 20 is applied as input to an integrator 21 and integrated thereby. The integrator 21 alternately integrates the output signal of the enveloping circuit 20 corresponding to the signal obtained from the left half of the light-receiving surface R of the image sensor and the output signal of the enveloping circuit 20 corresponding to the signal obtained from the right half of the light-receiving surface R of the image sensor, on the basis of the signal from the timing device 18. The output signal of the sampling and holding circuit 19 and the output signal of the integrator 21 are divided by a divider 22, the division by the divider 22 being effected so that the output signal of the sampling and holding circuit 19 is the denominator. The output signal of the divider 22 is a signal indicative of the contrast, namely, a signal gain-controlled for the brightness of the image plane. The output signal of the divider 22 will hereinafter be referred to as the contrast signal. That is, according to such gain control, even when the integrated value by the integrator 17 exhibits some decrease during an in-focus condition, the contrast signal during the in-focus condition is particularly emphasized and the focusing accuracy becomes better. The output signal of the divider 22 is applied as input to a first sampling and holding circuit 23 and a second sampling and holding circuit 24. The first sampling and holding circuit 23 is for the signal from the left half of the image sensor and the second sampling and holding circuit 24 is for the signal from the right half of the image sensor 8, and these sampling and holding circuits are designed such that each signal from the divider 23 is separately applied thereto by the sample signal from the timing device 18. The output signals of the first and second sampling and holding circuits 23 and 24 are applied as input to an adder 25 and also are applied as input to one input terminal of a first dividing circuit 26 and one input terminal of a second dividing circuit 27. The output signal of the adder 25 is applied as input to the other input terminals of the first and second dividing circuits 26 and 27. The first and second dividing circuits 26 and 27 effect division with the addition signal from the adder 25 as the denominator. The output signals of the first and second dividing circuits 26 and 27 are signals gain-controlled for the contrast as carried out in the prior art. A differential amplifier circuit 28 causes a signal corresponding to the difference between the division signals from the first and second dividing circuits 26 and 27 (a signal corresponding to the amount of deviation from the in-focus point) to be applied to a motor control circuit 29. The motor control circuit 29 drives a motor M to move the objective lens 3 in the direction of the optical axis so that the amount of deviation from the in-focus point becomes zero. Of course, the stage 1 may be moved. This makes automatic focusing possible.

The timing device 18 receives as input the signals from the start pulse generator 9, the timing pulses generating circuit 10, a first digital switch 30 and a second digital switch 31, applies a timing signal to the extracting function generating circuit 16, the integrator 17, the sampling and holding circuit 19, the integrator 21, the first sampling and holding circuit 23 and the second sampling and holding circuit 24, and controls the operating periods thereof.

Figure 2:
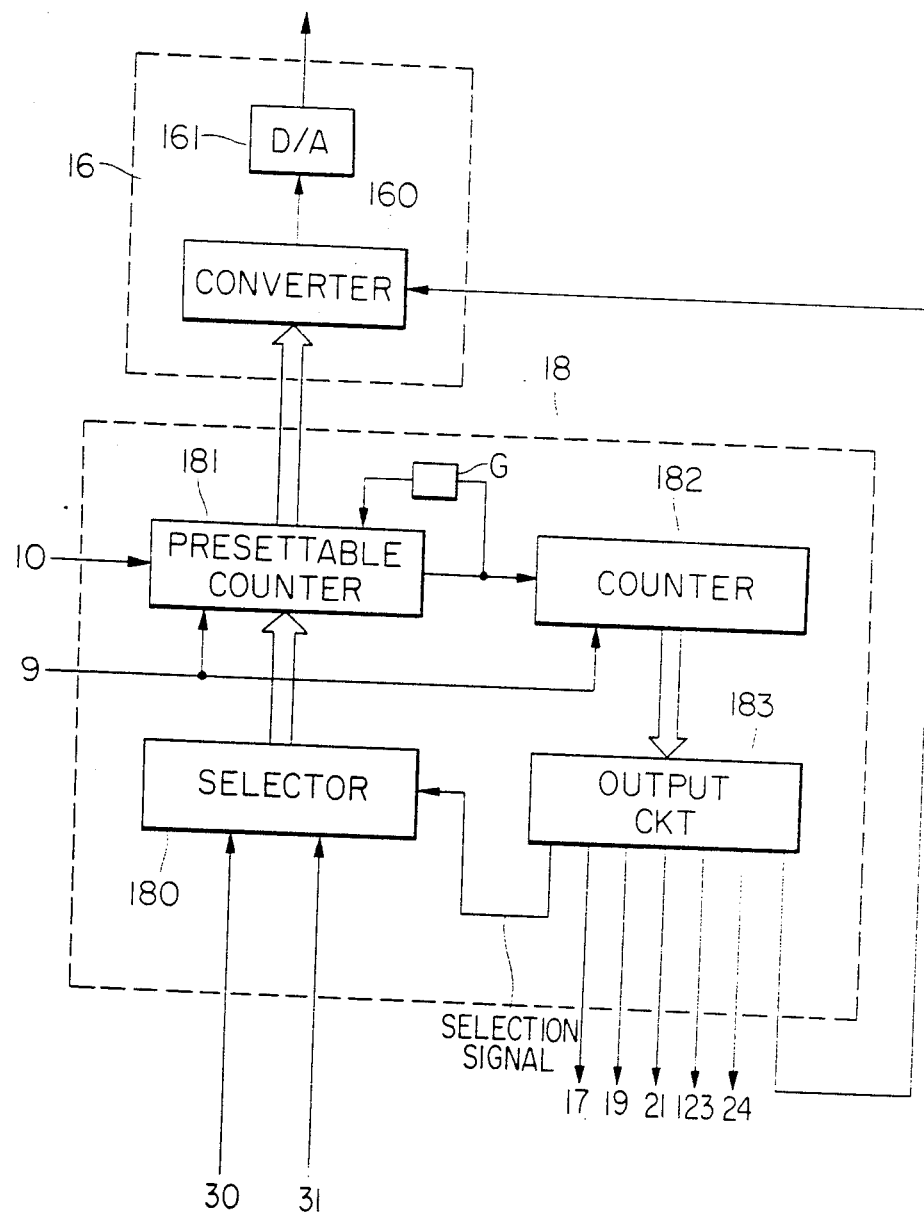
FIG. 2 shows the timing device and the extracting function generating circuit of FIG. 1.

The timing device 18, as shown in FIG. 2, has a selector 180, a presettable counter 181, a counter 182 and an output circuit 183. The presettable counter 181 and the counter 182 are reset by the start pulse from the start pulse generator 9. The presettable counter 181 counts the pulses from the pulse generating circuit 10 up to a number (hereinafter referred to as the predetermined value) obtained by subtracting from a total countable value N the preset value input from the digital switches 30 and 31 through the selector 180. When the predetermined value is reached, the presettable counter 181 puts out an output signal (hereinafter referred to as the carry signal) to the counter 182 and is reset by the carry signal through a gate G. However, it is after the presettable counter 181 is reset by the start pulse and after the presettable counter 181 is reset by the carry signal put out to counter 182 that the presettable counter 181 has counted to the predetermined value. The counter 182 counts the carry signal and applies the count value to the output circuit 183. The output circuit 183 has a read only memory circuit (ROM) using chiefly the count value by the counter 182 as the address designating signal, and the operation timing of the integrator 17, the sampling and holding circuit 19, the integrator 21, the first sampling and holding circuits 23, the second sampling and holding circuit 24 and the converting device 160 of the extracting function generating circuit 16 is controlled by the signal from a predetermined address of this memory circuit.

Figure 6:
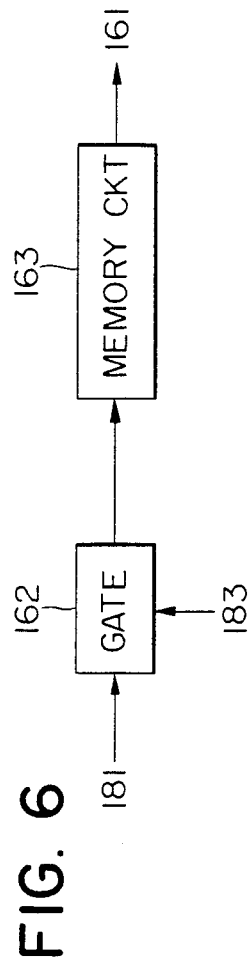
FIG. 6 is a block diagram of a converting device.

The converting device 160 has a gate 162 pulling out the count value of the presettable counter 181 shown, for example, in FIG. 6 only during the time when a signal is produced from the output circuit 183, and a read only memory circuit 163 connected in series with the gate 162 and converting said count value passed through said gate into a predetermined value and putting out the same. A digital value corresponding to the count value of the presettable counter 181 put out from the converting device 160 is converted into an analog value by a D/A converter 161 and put out from the extracting function generating circuit 16.

With such a construction, when a start pulse (FIG. 3(a)) is produced from the start pulse generator 9, the elements of the image sensor 8 are driven by pulses (FIG. 3(b)) successively put out from the pulse generating circuit 10, and a signal corresponding to the intensity of the light having entered each element as shown in FIG. 3(k) is put out from the image sensor 8. This signal is amplified by the amplifier 11, whereafter it is made into a signal as shown in FIG. 3(l) by the sampling and holding circuit 12 and thereafter, made into a signal as shown in FIG. 3(m) by the differentiation circuit 13, and then made into a signal as shown in FIG. 3(n) by the absolute value circuit 14.

Figure 7:
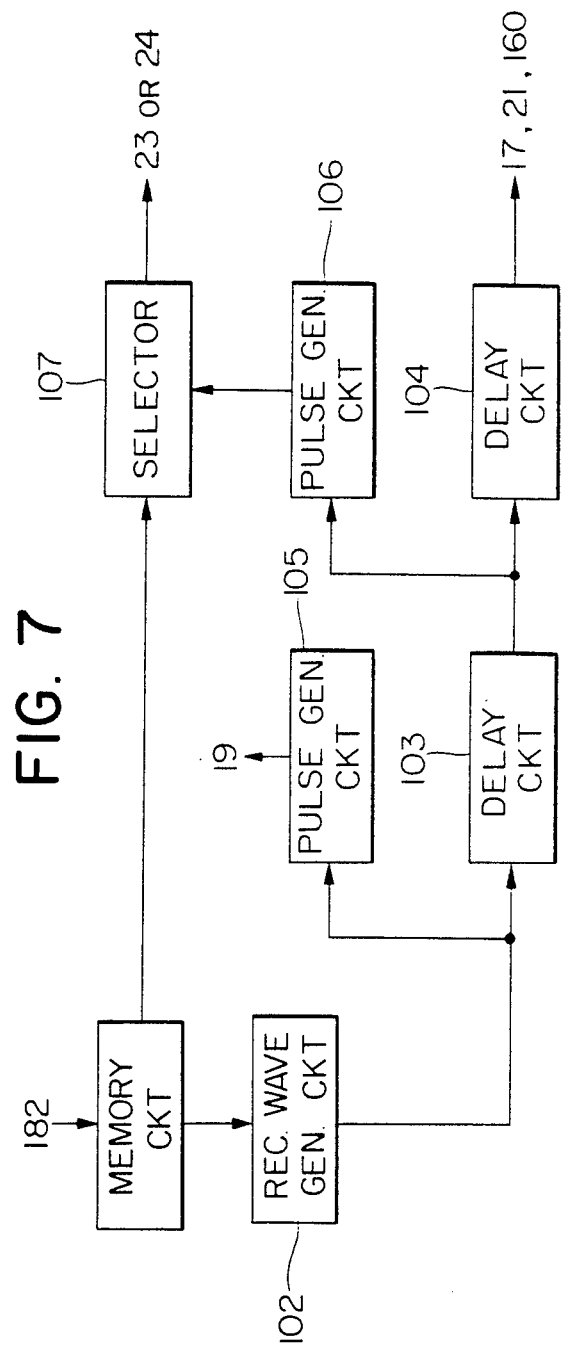
FIG. 7 is a block diagram of an output circuit.

As stated earlier, the presettable counter 181 and the counter 182 are reset by the start pulse. The output circuit 182 causes a selection signal to be applied as input to the selector 180 so that the selector 180 selects the preset value of the digital switch 30 by the count value zero of the counter 182 and puts out the same to the presettable counter 181. Assuming that a value zero is set in the digital switch 30, the presettable counter 181 counts the total countable value N as the predetermined value. The presettable counter 181 puts out a carry signal to the counter 182 (FIG. 3(c)) when it counts a number of pulses for the total countable value N and therefore, the count value of the counter 182 becomes 1. When the count value of the counter 182 becomes 1, the output circuit 183 applies the signal of FIG. 3(j) to the converting circuit 160 and the integrators 17 and 21, applies the signal of FIG. 3(i) to the sampling and holding circuit 19, and applies the signal $P_1$ of FIG. 3(h) to the first sampling and holding circuit 23. Here, how the signals of the output circuit 183 are made will be described in detail with reference to FIG. 7. FIG. 7 shows an example of the construction of the output circuit 183. The signals of FIGS. 3(h), (i) and (j) are based on the signal of FIG. 3(f). That is, when the count value of the counter 182 is 1, a rectangular wave generating circuit 102 is driven by the signal from a memory circuit 101 provided in the output circuit 183, and a signal as shown in FIG. 3(f) is put out. A signal obtained by delaying the signal of FIG. 3(f) by a delay circuit 103 by one pulse of FIG. 3(b) is made into the signal of FIG. 3(g), and a signal obtained by further delaying the signal of FIG. 3(g) by a delay circuit 104 by one pulse of FIG. 3(b) is made into the signal of FIG. 3(j). A pulse generating circuit 105 makes the signal of FIG. 3(i) in response to the falling of the signal of FIG. 3(f), and a pulse generating circuit 106 makes the signal of FIG. 3(h) in response to the falling of the signal of FIG. 3(g). The memory circuit 101 causes the selector 107 to put out the output signal of the pulse generating circuit 106 to the first sampling and holding circuit 23 in response to the count value 1 of the counter 182.

Accordingly, when N pulses of FIG. 3(b) are generated after the start pulse is generated at time $t_0$, the presettable counter 181 puts out a carry signal at time $t_1$ (FIG. 3(c)), and the output circuit 183 puts out the signal of FIG. 3(j). In accordance with the signal of FIG. 3(j) from the timing circuit 18, the extracting function generating circuit 16 puts out an extracting function. If the extracting function generating circuit 16 puts out a signal similar to the signal of FIG. 3(j), the output signal of the multiplier 15 becomes such as shown in FIG. 3(o). The output signal of the integrator 17 becomes a signal as shown in FIG. 3(p) which is obtained by integrating the signal of FIG. 3(o). The sampling and holding circuit 19 samples and holds the signal of FIG. 3(p) by the signal of FIG. 3(i) (which rises at time $t_2$) and therefore, the output signal thereof becomes such as shown in FIG. 3(q). The output signal of the enveloping circuit 20 takes the envelope of the signal of FIG. 3(o) and therefore, the output signal thereof becomes such as shown in FIG. 3(r). The integrator 21 integrates the signal of FIG. 3(r) and therefore, the output signal thereof becomes such as shown in FIG. 3(s) and thus, a signal sufficiently greater than the signal of FIG. 3(p) which is the output signal of the integrator 17 can be obtained. The first sampling and holding circuit 23 samples and holds the output signal of the divider 22 at time $t_3$.

When the presettable counter 181 again counts the total countable value N and a carry signal is applied as input to the counter 182, the count value of the counter 182 becomes 2. When the count value is 2, the output circuit 183 applies a selection signal to the selector 180 so that the selector 180 selects the preset value of the digital switch 31 and puts out the same to the presettable counter 181, and does not put out the other control signals. When the zero value is set in the digital switch 31, the presettable counter 181 counts the total countable value N as the predetermined value. When the count value of the counter 182 becomes 3 in this manner, a control signal is put out from the output circuit 183 in the same manner as previously described and each circuit is controlled as at times $t_1$–$t_4$ (time $t_{10}$ corresponds to time $t_1$, time $t_{20}$ corresponds to time $t_2$, time $t_{30}$ corresponds to time $t_3$ and time $t_{40}$ corresponds to time $t_4$). The difference from the times $t_1$–$t_4$ is that a sample pulse $P_2$ generated at time $t_{30}$ is applied as input to the second sampling and holding circuit 24. That is, the memory circuit 101 causes the selector 107 to put out the output signal of the pulse generating circuit 106 to the second sampling and holding circuit 24 in response to the count value of the counter 182.

In this manner, a signal corresponding to the image on the left-hand light-receiving surface of the image sensor 8 is obtained as the output signal of the first sampling and holding circuit 23 and a signal corresponding to the image on the right-hand light-receiving surface of the image sensor 8 is obtained as the output signal of the second sampling and holding circuit 24.

The output signal of the first sampling and holding circuit 23 and the output signal of the second sampling and holding circuit 24 are regularized by the adder 25 and the dividing circuits 26 and 27, and a signal corresponding to the condition is obtained by the differential amplifier 28.

When the count value of the counter 182 becomes 4, a start pulse is again generated, whereby the previously described operation is repeated.

Assuming that a value M (of course, actually a digital value corresponding thereto) has been set in the digital switch 30, the presettable counter 181 puts out carry signals when N-M pulses after the start pulse have been generated (FIG. 3(d)). That is, as shown in FIG. 3(d), the train of carry signals is leftwardly deviated relative to FIG. 3(c) by an amount corresponding to M pulses. Accordingly, the signals of FIGS. 3(f), (g), (h), (i) and (j) are also leftwardly deviated by an amount corresponding to M pulses and therefore, the extracting position changes. That is, the selected portion of the image on the image sensor 8 can be changed.

Also, assuming that the value M has been set in the digital switch 31, the presettable counter 181 puts out carry signals seventeen pulses after the count value of the counter 182 has become 2 and therefore, the train of carry signals assumes a form in which the interval between the second carry signal and the third carry signal is narrowed as shown in FIG. 3(e).

That is, by a suitable value being set in the digital switches 30 and 31, the extracting position can be freely adjusted while the extracting section is kept constant, and also the adjustment can be electrically accomplished, and this means the ease of adjustment.

Figure 4A:
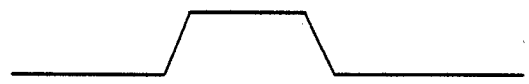
FIGS. 4A and 4B are a timing chart similar to FIG. 3.
Figure 4B:

Also, if the design is such that instead of the extracting function of FIG. 3(j), a function whose magnitude is variable with time as shown in FIGS. 4A and 4B is generated, the output signal of the multiplier 15 can be made into a signal in which importance is attached to the central portion of the extracting section and therefore, the error component created at the end portions of the image extracting section when the adjustment of the image extracting position by the digital switches is incomplete or when the resolving power of the adjustment is deficient can be decreased.

Figure 5A:
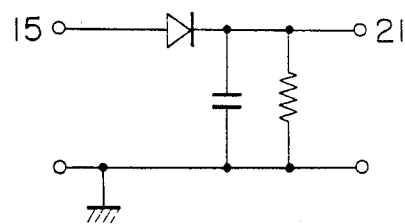
FIGS. 5A and 5B show enveloping circuits that may be employed in the present invention.
Figure 5B:
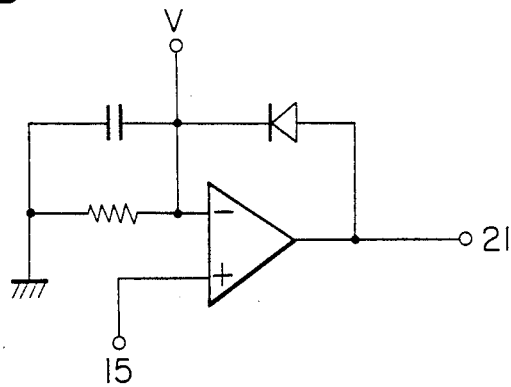

As will be seen from what has been described above, a difference of the above-described embodiment from the apparatus of the prior art is that the enveloping circuit 20 is provided as means for effectively taking out the peak level of an edge signal obtained from the image signal from the image sensor 8. Such enveloping circuit 20 may be, for example, one of those shown in FIGS. 5A and 5B, and the use of such circuit eliminates the inconvenience heretofore caused by integrating the signal taken out as the edge signal or the output signal of the absolute value circuit 14 by an integration circuit, thereby finding the area of the edge signal. As the means for effectively taking out the peak level, use may also be made of a peak holding circuit or other circuit instead of the enveloping circuit 20. Also, the output of the circuit 19 which integrates the output of the absolute value circuit 14 and the output of the circuit 21 which integrates the output of the enveloping circuit 20 are applied as inputs to the divider 22, whereby a substantially constant signal can always be obtained without the output of the divider 22, namely, the signal corresponding to the out-of-focus condition, being affected by the contrast, brightness, etc. of the image. That is, gain control is effected.

We claim:

1. A focus detecting apparatus having optical means movable to cause the light from an object to be imaged on a predetermined plane, means for detecting an intensity distribution of the object light passed through said optical means at a first plane between said optical means and said predetermined plane and an intensity distribution of the object light passed through said optical means at a second plane at an opposite side of said predetermined plane and producing respective detection signals, and means for converting said detection signals to output signals varying in one direction from a predetermined level in response to the light intensity distribution, said apparatus comprising:
   (a) means for forming an envelope of the output signal from said converting means;
   (b) first integrating means for integrating said envelope and producing an integration output;
   (c) second integrating means for integrating the output signal from said converting means; and
   (d) focus detecting means for detecting the amount of movement of said optical means necessary for said optical means to cause the object light to be imaged on said predetermined plane in accordance with outputs from said first and second integrating means.

2. A focus detecting apparatus according to claim 1, wherein said focus detecting means includes division means for dividing the output from said first integrating means by the output from said second integrating means.

3. A focus detecting apparatus according to claim 2, wherein said focus detecting means includes means for calculating said amount of movement of said optical means from a first output obtained through said division means after said detection signal corresponding to said first plane is processed through said conversion means, said forming means, said first and second integrating means, and from a second output obtained through said division means after said detection signal corresponding to said second plane is processed through said conversion means, said forming means, said first and second means and said division means.

4. A focus detecting apparatus according to claim 3, wherein said calculating means includes means for adding said first output and said second output to produce an output; means for dividing said first output by the output from said adding means, and means for dividing said second output by the output from said adding means.

5. A focus detecting apparatus having optical means movable to form an image of an object on a predetermined plane, and means for detecting an intensity component of light on a light receiving surface which receives object light passed through said optical means and producing a detection signal, said focus detecting apparatus comprising:
   (a) first means for forming an output signal indicative of a high frequency component of said detection signal;
   (b) second means for forming an output signal corresponding to the absolute value of the output signal from said first forming means;
   (c) means for forming an envelope of the output signal from said second forming means;
   (d) means for integrating said envelope and putting out an integrated value; and
   (e) focus detecting means for detecting a positional relationship between the object image formed through said optical means and said predetermined plane in accordance with the output from said integrating means.

6. A focus detecting apparatus according to claim 5, wherein said first forming means includes means for differentiating said detection signal.

7. A focus detecting apparatus according to claim 5, wherein said focus detecting means includes means for integrating the output signal from said second forming means and putting out an integrated value, and means for dividing the integrated value of said envelope by the integrated value of the output signal from said second forming means.

8. A focus detecting apparatus having optical means movable to cause light from an object to be imaged on a predetermined plane, and means for detecting an intensity distribution of the object light passed through said optical means at a first plane between said optical means and said predetermined plane and an intensity distribution of the object light passed through said optical means at a second plane at an opposite side of said predetermined plane and producing respective detection signals, said focus detecting apparatus comprising:
   (a) first means for forming an output signal indicative of a high frequency component of said detection signals;
   (b) second means for forming an output signal corresponding to an absolute value of the output signal from said first forming means;
   (c) means for forming an envelope of the output signal from said second forming means;
   (d) first integrating means for integrating said envelope and putting out an integrated value;
   (e) second integrating means for integrating the output signal from said second forming means; and
   (f) focus detecting means for detecting an amount of movement of said optical means necessary for the object light to be imaged on said predetermined plane, in accordance with outputs from said first and second integrating means.

9. A focus detecting apparatus according to claim 8, wherein said first forming means includes means for differentiating said detection signal.

10. A focus detecting apparatus according to claim 9, wherein said focus detecting means includes means for dividing the output from said first integrating means by the output from said second integrating means.

* * * * *